United States Patent
Bulboaca et al.

(10) Patent No.: US 8,804,716 B2
(45) Date of Patent: Aug. 12, 2014

(54) METHODS, SYSTEMS, AND COMPUTER READABLE MEDIA FOR EVOLVED GENERAL PACKET RADIO SERVICE (GPRS) TUNNELING PROTOCOL (EGTP) INDIRECT TUNNELING IN A VOICE OVER LTE (VOLTE) SIMULATION

(75) Inventors: Radu Bulboaca, Bucharest (RO); Claudia Ioana Tanase, Slatina (RO)

(73) Assignee: Ixia, Calabasas, CA (US)

( * ) Notice: Subject to any disclaimer, the term of this patent is extended or adjusted under 35 U.S.C. 154(b) by 85 days.

(21) Appl. No.: 13/458,602

(22) Filed: Apr. 27, 2012

(65) Prior Publication Data
US 2013/0287021 A1 Oct. 31, 2013

(51) Int. Cl.
*H04L 12/28* (2006.01)
*H04W 24/00* (2009.01)
*H04W 36/00* (2009.01)

(52) U.S. Cl.
CPC .......... *H04W 24/00* (2013.01); *H04W 36/0033* (2013.01); *H04L 12/28* (2013.01)
USPC ......................................... 370/389; 709/245

(58) Field of Classification Search
CPC .................................................... H04W 24/00

USPC ........................................... 370/389; 709/245
See application file for complete search history.

(56) References Cited

U.S. PATENT DOCUMENTS

2010/0189103 A1* 7/2010 Bachmann et al. ........... 370/389
2013/0031271 A1* 1/2013 Bosch et al. .................. 709/245

* cited by examiner

*Primary Examiner* — Wei Zhao
(74) *Attorney, Agent, or Firm* — Jenkins, Wilson, Taylor & Hunt, P.A.

(57) ABSTRACT

Methods, systems, and computer readable media for initiating evolved general packet radio service (GPRS) tunneling protocol (eGTP) indirect tunneling are disclosed. According to one method, the method occurs at a long term evolution (LTE) node simulator including a module for processing data packets. The method includes receiving a data packet associated with a user device. The data packet includes an endpoint identifier for identifying a first transceiver simulated by the LTE node simulator. The method also includes determining, using the endpoint identifier, whether the data packet should be processed by the module. The method further includes in response to determining that the data packet should be processed by the module, processing the data packet. The method also includes in response to determining that the data packet should not be processed by the module, initiating routing the data packet to a network node.

21 Claims, 3 Drawing Sheets

METHODS, SYSTEMS, AND COMPUTER READABLE MEDIA FOR EVOLVED GENERAL PACKET RADIO SERVICE (GPRS) TUNNELING PROTOCOL (EGTP) INDIRECT TUNNELING IN A VOICE OVER LTE (VOLTE) SIMULATION

TECHNICAL FIELD

The subject matter described herein relates to mobile network equipment testing. More specifically, the subject matter relates to methods, systems, and computer readable media for initiating eGTP indirect tunneling.

BACKGROUND

In some mobile networks, user devices (e.g., smartphones, computers, mobile handsets, or other user equipment (UE)) may be connected to a core network and/or the Internet via a radio access network (RAN). Each mobile network may include transceivers, such as base stations, node Bs, or evolved node Bs (eNBs), for facilitating communications between user devices, networks, and/or nodes (e.g., web and media servers). In a voice over long term evolution (VoLTE) environment, an eGTP protocol may be used to transport Internet protocol (IP) packets from external packet networks to user devices.

While an eGTP protocol may be used to transport IP packets between various portions of an LTE or an evolved packet core (EPC) network, problems can arise during mobility events. To ensure that no packets are lost during mobility events and to increase end to end reliability, some traffic may be sent back to a core network for transmission to another destination. For example, traffic originating in the Internet may be routed through the core network towards a user device. When the user device detaches from a first eNB and moves to a second eNB, the packets that are already on the way towards the first eNB may need to be routed through indirect tunnels (e.g., via various nodes in the core network) to the second eNB.

While routing packets to the core network may prevent packets from being lost in conventional LTE networks, mobile network equipment simulation and/or testing platforms add further complexity. For example, a LTE node simulator may simulate multiple eNBs and user devices. Each simulated eNB may be responsible for transferring data between multiple user devices and for handling numerous mobility events. As a result, the simulator must simulate mobility events for multiple user devices and handle multiple instances of indirect tunneling. Thus, mobile network equipment simulation and/or testing platforms may require initiating indirect tunneling in an efficient and highly scalable manner.

Accordingly, in light of these difficulties, a need exists for improved methods, systems, and computer readable media for initiating eGTP indirect tunneling.

SUMMARY

Methods, systems, and computer readable media for initiating evolved general packet radio service (GPRS) tunneling protocol (eGTP) indirect tunneling are disclosed. According to one method, the method occurs at a long term evolution (LTE) node simulator including a module for processing data packets. The method includes receiving a data packet associated with a user device. The data packet includes an endpoint identifier for identifying a first transceiver simulated by the LTE node simulator. The method also includes determining, using the endpoint identifier, whether the data packet should be processed by the module. The method further includes in response to determining that the data packet should be processed by the module, processing the data packet. The method also includes in response to determining that the data packet should not be processed by the module, initiating routing the data packet to a network node.

A system for initiating eGTP indirect tunneling is also disclosed. The system includes a long term evolution (LTE) node simulator including a module for processing data packets. The module is configured to receive a data packet that includes an endpoint identifier for identifying a first transceiver simulated by the LTE node simulator, to determine whether the data packet should be processed by the module, in response to determining that the packet should be processed by the module, to process the data packet, and in response to determining that the packet should not be processed by the module, to initiate routing the data packet to a network node.

The subject matter described herein may be implemented in software in combination with hardware and/or firmware. For example, the subject matter described herein may be implemented in software executed by a processor (e.g., a hardware-based processor). In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory devices, such as disk memory devices, chip memory devices, programmable logic devices, such as field programmable gate arrays, and application specific integrated circuits. In addition, a computer readable medium that implements the subject matter described herein may be located on a single device or computing platform or may be distributed across multiple devices or computing platforms.

As used herein, the term "node" refers to a physical computing platform including one or more processors and memory.

As used herein, the terms "function" or "module" refer to software in combination with hardware and/or firmware for implementing features described herein. In some embodiments, a module may include a field-programmable gateway array (FPGA), an application-specific integrated circuit (ASIC), or a processor.

BRIEF DESCRIPTION OF THE DRAWINGS

The subject matter described herein will now be explained with reference to the accompanying drawings of which.

DETAILED DESCRIPTION

The subject matter described herein discloses methods, systems, and computer readable media for initiating eGTP indirect tunneling. When testing LTE networks and/or other wireless communications network, it may be desirable to test the response of the network and other equipment under non-trivial load conditions. During simulation and/or testing of one or more LTE nodes, certain packet processing may be offloaded or performed by a dedicated module (e.g., a FPGA or an ASIC). The dedicated module may be configured to perform data processing operations more quickly than a general purpose module. In some instances, configuring a dedicated module to handle numerous processing paths for various events (e.g., handover or other mobility events) may create excessive complexity and may require vast amounts of effort and other resources to implement.

Advantageously, aspects of the present subject matter herein is directed to an LTE node simulator configured to identify packets as associated with endpoints no longer serving corresponding user devices and to bypass or avoid substantial processing of the packets by the dedicated module. After identification, the packets may be routed or sent to a core network node so that the packets may be delivered to appropriate nodes, e.g., endpoints that are currently serving the corresponding user devices associated with the data packets. In some embodiments, the LTE node simulator may generate, maintain, and/or use a dynamic list of identifiers for identifying packets that need to be sent back to the core network.

Figure 1:
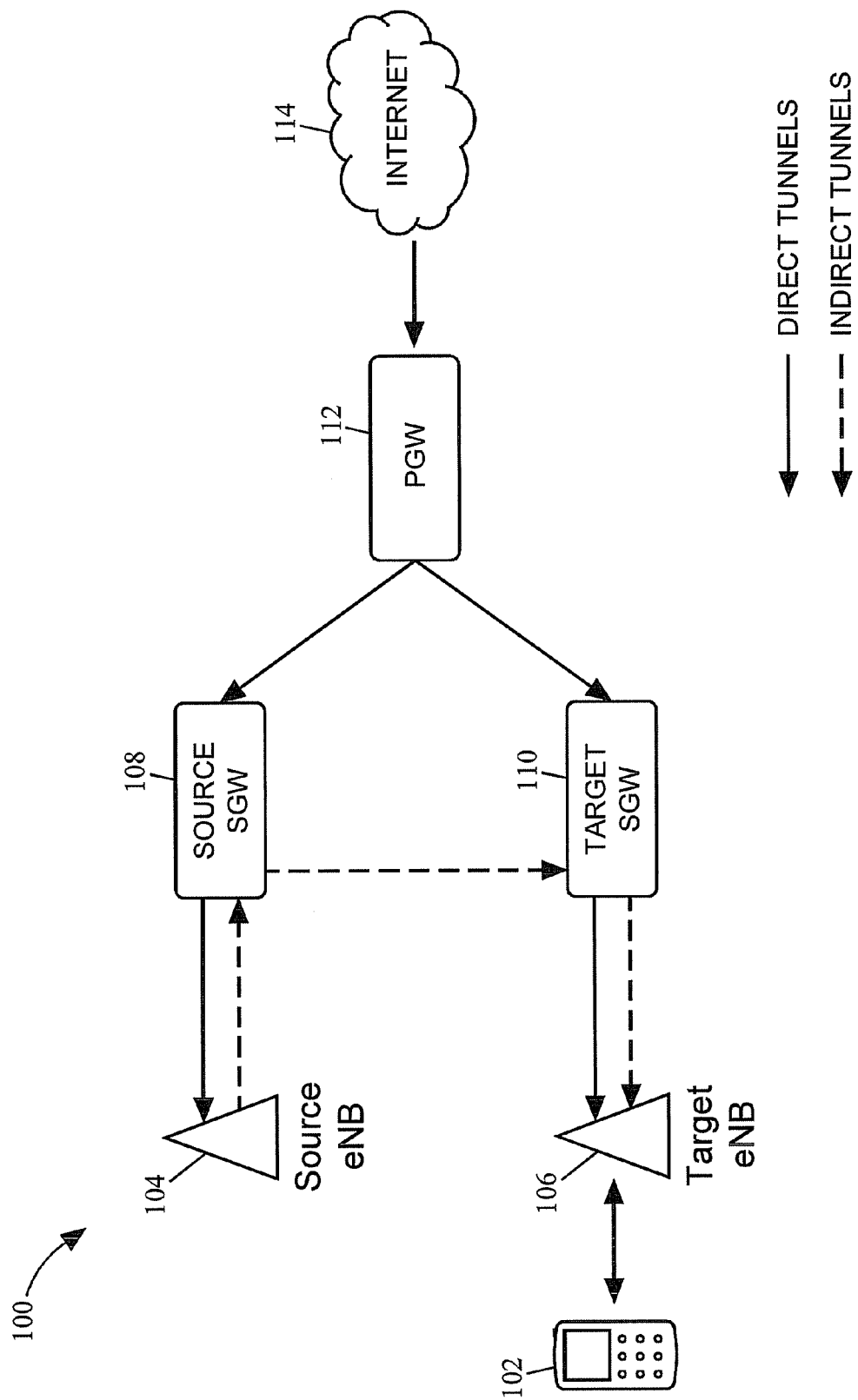
FIG. 1 is a diagram illustrating an exemplary conventional LTE network.

FIG. 1 diagram illustrating an exemplary conventional LTE network 100. In some embodiments, LTE network 100 may include one or more nodes of a system architecture evolution (SAE) core or evolved packet core (EPC) network and/or other nodes. Referring to FIG. 1, LTE Network 100 may include a LTE user device 102, a source eNB 104, a target eNB 106, a source serving gateway (SGW) 108, a target SGW 110, a packet gateway (PGW) 112 and a packet network 114 (e.g., the Internet). LTE user device or user equipment (UE) 102 may be any suitable device usable by a user (e.g., a mobile subscriber) to communicate via LTE network 100. For example, UE 102 may be a mobile phone, a laptop, a computing platform, or other device for communicating via LTE network 100.

ENBs 104 and 106 may each represent any suitable entity (e.g., a base transceiver station (BTS), node B, etc.) for providing data via an air interface. For example, eNB 104 may be an LTE mobile network entity having functionality similar to that of a radio network controller (RNC) and a base station (BS) in 2G networks or an RNC and a Node B in 3G mobile networks. In some embodiments, eNBs 104 and 106 may communicate directly with LTE user devices and may be responsible for header compression, ciphering, reliable delivery of packets, admission control, and radio resource management. ENBs 104 and 106 may also communicate with various other modules and/or nodes, e.g., SGW 108, SGW 110, or a mobility management entity (MME) for performing various control plane signaling functions such as network attaching, UE authentication, bearer channel setup, and mobility management. In some embodiments, eNBs 104 and 106 may be directly connected via X2 interfaces.

SGWs 108 and 110 may each represent any suitable entity (e.g., a node containing a processor and a memory) for routing and forwarding data packets. For example, SGW 108 (and PGW 112) may include functions similar to and/or functions different from a gateway GPRS support node (GGSN) in a 3G network. SGWs 108 and 110 may be nodes for providing data paths between eNBs and PGW 112. For example, SGWs 108 and eNB 104 may communicate via an S1-U or other interface and SGWs 108 and PGW 112 may communicate via an S5 or S8 interface. In some embodiments, SGWs 108 and 110 may part of an EPC or system architecture evolution (SAE) network and packets may transverse SGW 108 using an eGTP or GTP protocol. SGWs 108 and 110 may perform replication or notification procedures for lawful interception purposes. SGWs 108 and 110 may also act as a mobility anchor for the user or data plane (e.g., during inter-eNB handovers). SGWs 108 and 110 may manage and store UE contexts, e.g., information associated with the IP bearer service. For example, for an idle state UE, SGW 108 may terminate a downlink data path and initiate paging when downlink data arrives for the UE. SGWs 108 and 110 may also be used for communicating with other mobile networks, such as 2G/3G networks. SGWs 108 and 110 may provide charging services and/or policy enforcement for UE 102, network 114, and service classes.

PGW 112 may represent any suitable entity for communicating with external packet data networks, such as packet network 114. For example, PGW 112 may be an access point for traffic to UE 102 from network 114. PGW 112 may perform policy enforcement, packet filtering, charging support, lawful interception, and/or other functions. PGW 112 may also act as a mobility anchor between 3GPP and non-3GPP networks, such as CDMA and WiMAX networks. In some embodiments, UE 102 may have simultaneous connectivity with multiple PGWs for accessing multiple packet networks.

Packet network 114 may represent various nodes that communicate with UE 102 via PGW 112. For example, packet network 114 may represent the Internet, or a portion thereof, and may include nodes external to an EPC network (e.g., SGWs 108 and 110, PGW 112, an MME, and an HSS). Packet network 114 may include web servers, media servers, and other nodes for providing services and/or media content.

In some embodiments, UE 102 and packet network 114 may communicate data packets via one or more tunneling protocols. For example, a GTP protocol or an eGTP protocol (e.g., eGTP-U) may be used to provide tunneling support for communicating user data between eNB 106 and EPC elements (e.g., SGW 110 and PGW 112). UE context information, such as tunnel endpoint identifiers (TEIDs), medium access control (MAC) and/or IP addresses, may be stored in the data packets and tunnels may be set up between various nodes. In some embodiments, a GTP protocol or an eGTP protocol may be used for various interfaces, such as S1-U, S4, S5 and S8 interfaces. GTP tunnels may be used to carry encapsulated transport packet data units (T-PDUs) and signaling messages between tunnel endpoints. The transport bearer may be identified by a source TEID, a destination TEID, a source IP address, and/or destination IP address.

During inter-eNB handovers, incoming traffic at eNB 104 may be routed back to the core network (e.g., SGW 108) when UE moves to eNB 106 if no direct connection (e.g., an X2 interface) exists between eNB 104 and 106. For example, packet headers may be modified (e.g., a source MAC address parameter value and target MAC address parameter value may be exchanged) before tunneling the modified packets toward eNB 106. In this example, the packets may be transported from eNB 104 to SGW 108, from SGW 108 to SGW 110, and from SGW 110 to eNB 106. By sending the packets back to a mobility anchor in the core network, the core network may reroute the packets to UE 102 via eNB 106 thereby ensuring packets are not lost during mobility events.

Figure 2:
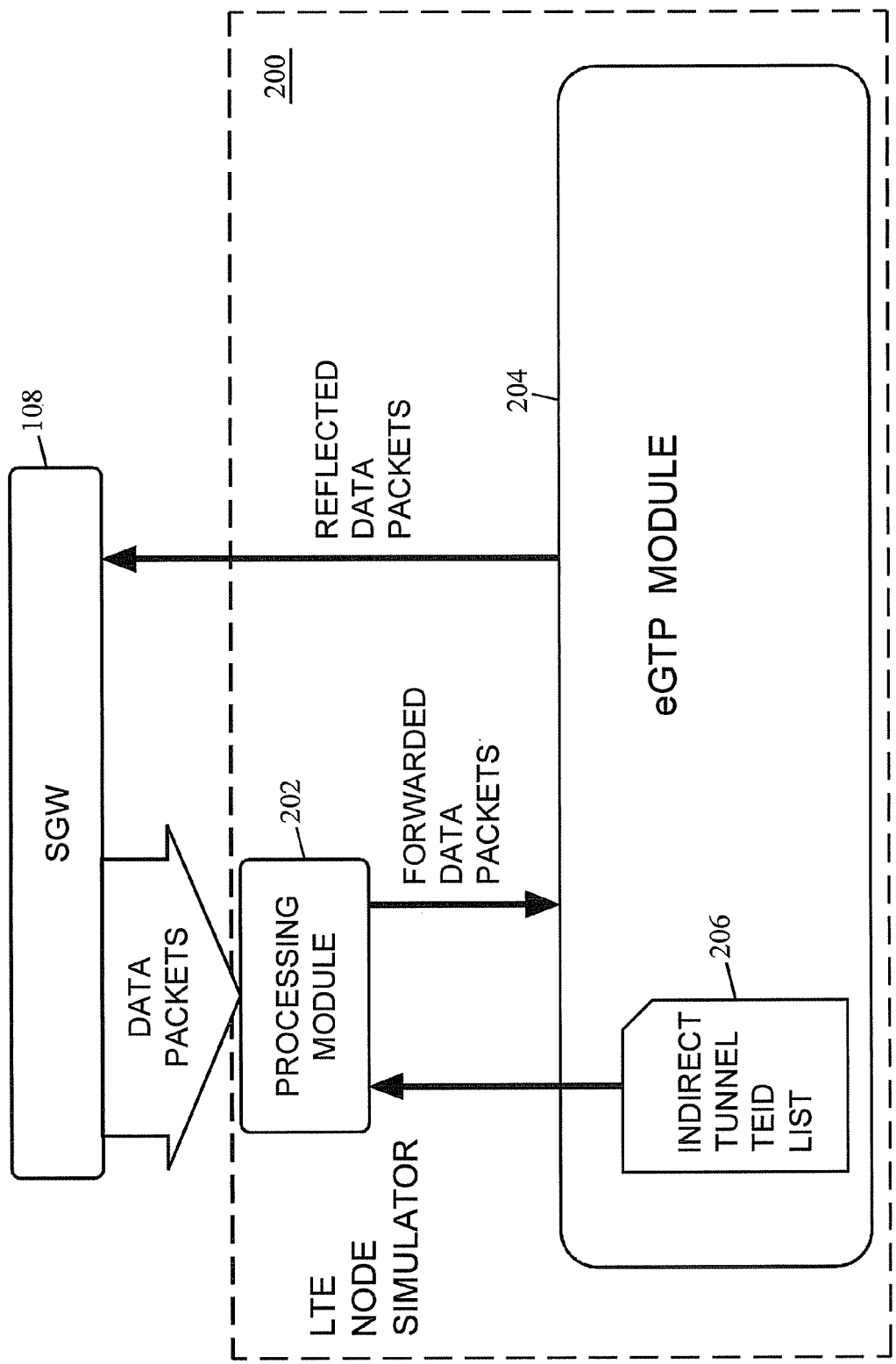
FIG. 2 is a diagram illustrating an LTE node simulator according to an embodiment of the subject matter described herein.

FIG. 2 is a diagram illustrating an LTE node simulator 200 according to an embodiment of the subject matter described herein. LTE node simulator 200 may include a mobile network equipment simulation and/or testing platform for simulating and testing one or more aspects of a communications network and/or nodes therein. In some embodiments, LTE node simulator may include various modules (e.g., circuits and/or software executed by a processor) for connecting to various interfaces associated with one or more mobile network equipment or nodes. For example, LTE node simulator 200 may be configured to simulate eNBs, UEs, and/or an MME for testing various aspects of an EPC network, or portions therein (e.g., SGW 108).

Referring to FIG. 2, LTE node simulator 200 may include a processing module 202 and an eGTP module 204. Processing module 202 may be any suitable entity for receiving, generating, and/or analyzing data packets, such as real time protocol (RTP) packets. Processing module 202 may include one or more communications interfaces. Each communications interface may communicate with one or more interfaces, e.g., via GTP or eGTP tunnels. For example, an S1 interface, an S11 interface, an X2 interface, and other interfaces associated with LTE node simulator 200 or processing module 202 may be used for receiving or sending various messages.

In some embodiments, processing module 202 may include a processor and/or a circuit, such as an FPGA or ASIC, configured to receive, process, and/or generate data packets. Data packets may be encapsulated within various headers and/or associated with protocols. For example, data packet may include RTP packets, user datagram protocol (UDP) packets, or transmission control protocol (TCP) packets. In some embodiments, data packets may include an eGTP header. The eGTP header may include a destination TEID, a source TEID, or other identifiers, such as MAC addresses or IP addresses.

EGTP module 204 may be any suitable entity (e.g., software or logic executing on a processor) for generating and/or simulating data packets and/or signaling or control plane packets. For example, eGTP module 204 may generate various data packets and set up eGTP tunnels for communicating the data packets between UEs and packet network 114 via EPC nodes in network 100. EGTP module 204 may include functionality for managing simulation of various nodes (e.g., eNBs, MMEs, UEs, and/or other adjacent or related nodes). For example, eGTP module 204 may help perform multi-UE simulation, eNB simulation, UE call dispatching (including both real and simulated UEs), UE traffic profile configuration, call automation, quality of service (QoS) testing, selective reporting and statistics, and call tracing.

In some embodiments, eGTP module 204 may execute user scripts for performing various actions or simulations. For example, user scripts may include or indicate various simulation scenarios, such as predetermined sequences of messages representing simulated actions performed by simulated UEs. In some embodiments, user scripts may include one or more pre-defined scripts for simulating different LTE traffic/load scenarios in which multiple UEs are connected to an eNB. At any given time, the load on a simulated eNB may include UEs continuously connecting and disconnecting to the network, making and receiving calls, sending data, roaming to another eNB within the network, etc. Moreover, the particular mix of UEs and how they behave may be highly dependent upon the network carrier and/or the device under test's location within the network. Therefore, user scripts may include a wide variety of primitive/basic operations that are typically performed by individual UEs so that a network operator can customize their simulated traffic mix to be similar to real world scenarios of interest.

For example, user scripts may include originating scripts associated with a simulated UE that originates a call/session. Originating scripts may include, but are not limited to, attach, detach, session establishment and release, handover, session initiation protocol (SIP) calls, file transfer protocol (FTP) calls, and hypertext transfer protocol (HTTP) calls. Conversely, user scripts may also include terminating scripts associated with a simulated UE that terminates a call/session such as MME-initiated detach, HSS-initiated detach, handover, and SIP/FTP/HTTP calls.

EGTP module 204 may generate and/or maintain a data structure or indirect tunnel TEID list 206 for storing various identifiers associated with one or more events. For example, eGTP module 204 may identify the UEs for which indirect tunnels need to be created based on mobility events (e.g., attach, handover, and/or detach events) and may store TEIDs or other identifiers associated with the UEs in TEID list 206. TEID list 206 may include any suitable entity (e.g., a non-transitory computer readable medium) useable for storing information for identifying UEs or bearer connections involved in active voice calls at the time of a mobility event (e.g., a handover procedure). In some embodiments, entries may be dynamically added based on one or more factors, such as simulation scenarios including mobility events and active calls.

As stated above, LTE node simulator 200 and/or processing module 202 can improve efficiency and resource utilization by reflecting or re-routing certain data packets back to SGW 108 or another network node. For example, after receiving a data request from UE 102, traffic from an IMS network or packet network 114 may be routed through PGW 112 and SGW 108 towards UE 102. When a mobility event occurs, such as UE 102 detaching from a first transceiver simulated by LTE node simulator 200 and moving to a second transceiver, the traffic that is already en route may be identified and routed back to the core network without being fully processed by processing module 202.

In some embodiments, processing module 202 may include an FPGA configured to generate and/or analyze stateful or session-aware RTP traffic. Before fully processing a data packet, processing module 202 may receive, obtain, or access a TEID contained in the data packet. Processing module 202 may also request, receive, or otherwise access TEID list 206, e.g., from eGTP module 204. Processing module 202 may check, query, or otherwise use the obtained identifier and TEID list 206 to determine whether a data packet should be processed or whether the data packet should be reflected (e.g., sent back to a network node for delivery to another transceiver).

In some embodiments, if the identifier associated with the data packet matches an entry in TEID list 206, processing module 202 may stop processing the data packet and may forward or send the data packet to eGTP module 204 and/or an egress port. For example, an RTP packet may be sent to a port and/or an associated processor configured to send the data packet to SGW 108 or another network node. The "reflected" data packet may be sent via one or more indirect tunnels and may be eventually received by UE 102 via a second transceiver.

In some embodiments, LTE node simulator, or a module therein, may modify one or more portions of the data packet. The modification may be for routing the data packet to a network node and/or a subsequent destination. For example, after determining that a data packet is to be sent back to SGW 108, a destination MAC address parameter value and a source MAC address parameter value in the RTP header may be exchanged so that the new destination MAC parameter value is the original source MAC address parameter value and vice versa. In another example, other header information may be added, deleted, and/or modified.

In some embodiments, the second transceiver may include a simulated transceiver. For example, after receiving a reflected data packet, a network node may route the data packet toward an eNB that is simulated by LTE node simulator 200 or another entity. In this example, processing module 202 may obtain a TEID associated with the data packet, determine that TEID does not match an entry in TEID list 206 (e.g., the TEID in data packet is associated with the second transceiver), and may process and/or analyze the packet.

In some embodiments, the second transceiver may include an eNB, a node B, a base station or other node that is separate from LTE node simulator 200. For example, after receiving a reflected data packet, a network node may route the data packet toward eNB 106. In this example, eNB 106 may process the packet.

Figure 3:
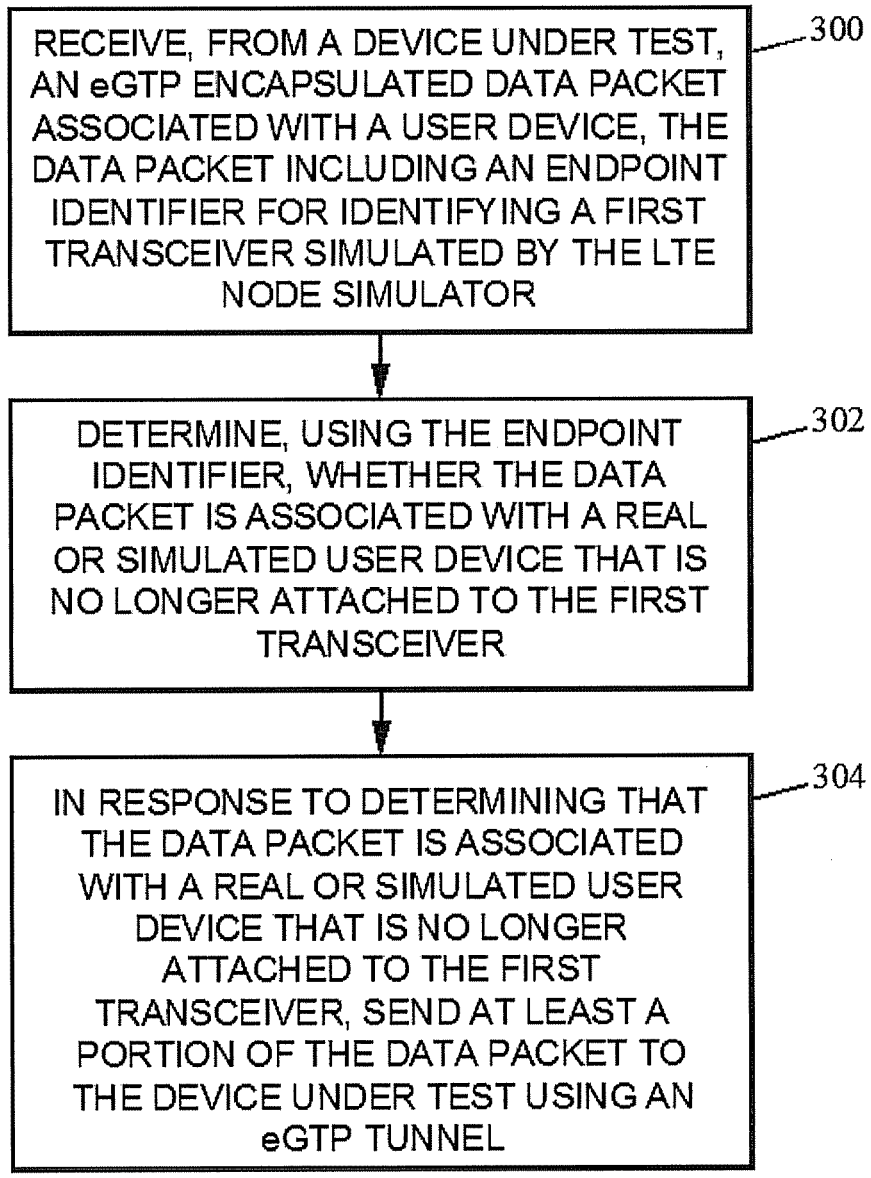
FIG. 3 is a diagram illustrating an exemplary process for initiating eGTP indirect tunneling according to an embodiment of the subject matter described herein.

FIG. 3 is a diagram illustrating an exemplary process for initiating eGTP indirect tunneling according to an embodiment of the subject matter described herein. In some embodiments, the exemplary process described herein, or portions thereof, may be performed by LTE node simulator 200, processing module 202, eGTP module 204, and/or another node or module.

In step 300, an eGTP encapsulated data packet associated with a user device may be received from a device under test. The data packet may include an endpoint identifier for identifying a first transceiver simulated by the LTE node simulator. For example, a data packet may be received via an eGTP tunnel between SGW 108 and LTE node simulator 200. The packet may include a TEID that indicates an eNB simulated by LTE node simulator 200.

In some embodiments, the data packet may include an RTP packet, a UDP packet, or a TCP packet. In some embodiments, the data packet may be received by or at a communications interface associated with LTE node simulator 200 or a processing module. In some embodiments, the processing module may include a FPGA, an ASIC, or a processor.

In step 302, it may be determined, using the endpoint identifier, whether the data packet is associated with a real or simulated user device that is no longer attached to the first transceiver. For example, before fully processing a data packet, processing module 202 may parse an eGTP header of the data packet and obtain a TEID (e.g., a destination TEID). Using the TEID and a dynamic TEID list 206 provided by eGTP module 204, processing module 202 may identify a packet as no longer being attached to the first transceiver or being associated with a different transceiver, e.g., a mobility event or handover procedure occurs thereby associating the user device with target eNB 106.

In some embodiments, determining that the data packet should not be processed by the module may include querying, using the endpoint identifier, a data structure containing endpoint identifiers that are associated with user devices that recently performed mobility events (e.g., an inter-eNB handover procedure) and receiving an indication that the endpoint identifier matches an entry in the data structure. In some embodiments, the data structure may dynamically add a user device that is involved in a call when the mobility event occurs (e.g., when a handover is initiated, in progress, or is completed).

In step 304, in response to determining that the data packet is associated with a real or simulated user device that is no longer attached to the first transceiver, at least a portion of the data packet to the device under test may be sent using an eGTP tunnel. For example, before fully processing a data packet, processing module 202 may obtain a TEID from the data packet. Using the TEID and a dynamic TEID list 206 provided by eGTP module 204, processing module 202 may identify a packet as being associated with a new transceiver and may bypass or stop further processing. Processing module 202 may send the data packet to an egress port for forwarding the data packet back to a core network node.

In some embodiments, sending at least a portion of the data packet to the device under test using an eGTP tunnel may include modifying the data packet, sending the modified data packet to the device under test, or routing the modified data packet to a second transceiver that is associated with the user device. For example, modifying the data packet may include inverting or exchanging identifiers (e.g., a source MAC address becoming a destination MAC address and vice versa) in one or more headers associated with the data packet.

In some embodiments, the device under test may include a simulated network node, a core network node, a gateway, a mobility management entity, or a server. For example, a network node may include a SGW, a PGW, and/or other nodes in an EPC network or an LTE network. In another example, a network node may be simulated by another node or module, e.g., LTE node simulator 200 or other mobile network equipment simulation and/or testing platform.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for initiating evolved general packet radio service (GPRS) tunneling protocol (eGTP) indirect tunneling, the method comprising:
    at a long term evolution (LTE) node simulator including a module for processing data packets:
        receiving, from a device under test, an eGTP encapsulated data packet associated with a user device, the data packet including an eGTP header having an endpoint identifier for identifying a first transceiver simulated by the LTE node simulator;
        determining, using the endpoint identifier, whether the data packet is associated with a real or simulated user device that is no longer attached to the first transceiver, wherein determining that the data packet is associated with a real or simulated user device that is no longer attached to the first transceiver includes querying, using the endpoint identifier, a data structure containing endpoint identifiers that are associated with user devices that recently performed mobility events and receiving an indication that the endpoint identifier matches an entry in the data structure; and
        in response to determining that the data packet is associated with a real or simulated user device that is no longer attached to the first transceiver, sending at least a portion of the data packet to the device under test using an eGTP tunnel.

2. The method of claim 1 where sending at least a portion of the data packet to the device under test using an eGTP tunnel includes:
    modifying the data packet;
    sending the modified data packet to the device under test; or
    routing the modified data packet to a second transceiver that is associated with the user device.

3. The method of claim 1 comprising in response to determining that the data packet is associated with a real or simulated user device that is attached to the first transceiver, processing the data packet.

4. The method of claim 1 wherein the user devices are dynamically added to the data structure based on whether the user devices are involved in active calls when the mobility events occur.

5. The method of claim 1 wherein the first transceiver includes a base station, a node b, or an evolved node b (eNB).

6. The method of claim 1 wherein the device under test includes a simulated network node, a core network node, a gateway, a mobility management entity, or a server.

7. The method of claim 1 wherein the user device includes a simulated user device.

8. The method of claim 1 wherein the LTE node simulator simulates multiple transceivers.

9. The method of claim 1 wherein the endpoint identifier includes a tunnel endpoint identifier (TEID).

10. The method of claim 1 wherein the module includes a field-programmable gateway array (FPGA), an application-specific integrated circuit (ASIC), or a processor.

11. A system for initiating evolved general packet radio service (GPRS) tunneling protocol (eGTP) indirect tunneling, the system comprising: a long term evolution (LTE) node simulator including a module for processing data packets, the LTE node simulator comprising:
the module configured to receive, from a device under test, an eGTP encapsulated data packet including an eGTP header having an endpoint identifier for identifying a first transceiver simulated by the LTE node simulator, to determine whether the data packet is associated with the user device that is no longer attached to the first transceiver, and in response to determining that the data packet is associated with the user device that is no longer attached to the first transceiver, to send at least a portion of the data packet to the device under test using an eGTP tunnel, wherein the module is configured to determine that the data packet is associated with a real or simulated user device that is no longer attached to the first transceiver by querying, using the endpoint identifier, a data structure containing endpoint identifiers that are associated with user devices that recently performed mobility events and receiving an indication that the endpoint identifier matches an entry in the data structure.

12. The system of claim 11 where the module is configured to initiate routing the data packet to the device under test using an eGTP tunnel by:
modifying the data packet;
sending the modified data packet to the device under test; or
routing the modified data packet to a second transceiver that is associated with the user device.

13. The system of claim 11 wherein the module is configured to process the data packet in response to determining that the packet is associated with a real or simulated user device that is attached to the first transceiver.

14. The system of claim 11 comprising:
an eGTP module configured to maintain the data structure and to dynamically add an identifier to the data structure based on whether a related user device is involved in an active call when the mobility event occur.

15. The system of claim 11 wherein the first transceiver includes a base station, a node b, or an evolved node b (eNB).

16. The system of claim 11 wherein the device under test includes a simulated network node, a core network node, a gateway, a mobility management entity, or a server.

17. The system of claim wherein the user device includes a simulated user device.

18. The system of claim 11 wherein the LTE node simulator simulates multiple transceivers.

19. The system of claim 11 wherein the endpoint identifier includes a tunnel endpoint identifier (TEID).

20. The system of claim 11 wherein the module includes a field-programmable gateway array (FPGA), an application-specific integrated circuit (ASIC), or a processor.

21. A non-transitory computer readable medium comprising computer executable instructions embodied in the non-transitory computer readable medium that when executed by a processor of a computer control the computer to perform steps comprising:
at a long term evolution (LTE) node simulator including a module for processing data packets:
receiving, from a device under test, an eGTP encapsulated data packet associated with a user device, the data packet including an eGTP header having an endpoint identifier for identifying a first transceiver simulated by the LTE node simulator;
determining, using the endpoint identifier, whether the data packet is associated with a real or simulated user device that is no longer attached to the first transceiver, wherein determining that the data packet is associated with a real or simulated user device that is no longer attached to the first transceiver includes querying, using the endpoint identifier, a data structure containing endpoint identifiers that are associated with user devices that recently performed mobility events and receiving an indication that the endpoint identifier matches an entry in the data structure; and
in response to determining that the data packet is associated with a real or simulated user device that is no longer attached to the first transceiver, sending at least a portion of the data packet to the device under test using an eGTP tunnel.

* * * * *